May 30, 1944. C. H. INGWER ET AL 2,350,313
BOLT THREADER
Filed Aug. 29, 1942
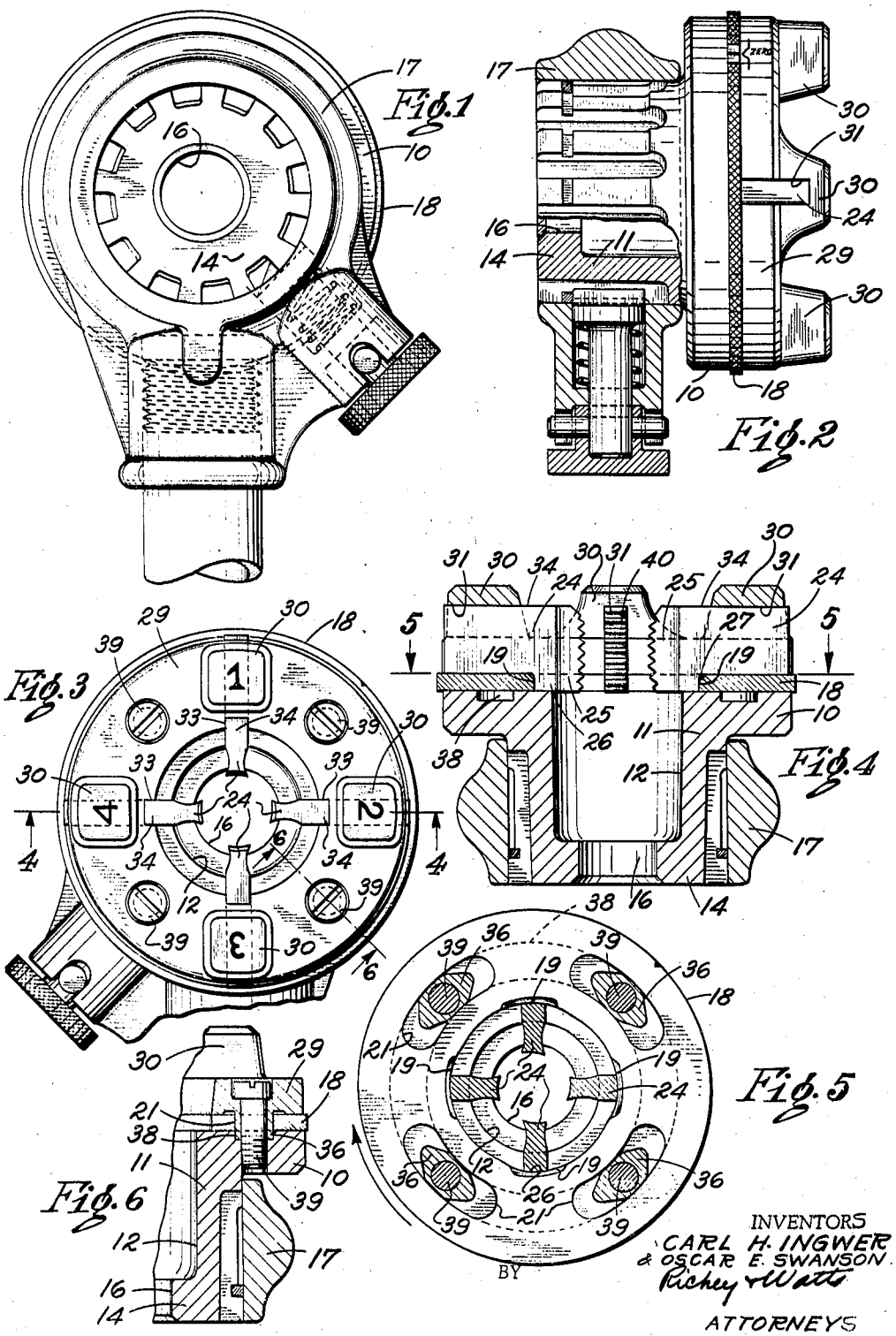
INVENTORS
CARL H. INGWER
& OSCAR E. SWANSON
BY Richey + Watts
ATTORNEYS Patented May 30, 1944

2,350,313

UNITED STATES PATENT OFFICE 2,350,313

BOLT THREADER

Carl H. Ingwer and Oscar E. Swanson, Elyria, Ohio, assignors to The Ridge Tool Company, North Ridgeville, Ohio, a corporation of Ohio Application August 29, 1942, Serial No. 456,642

4 Claims. (Cl. 10—122)

This invention relates broadly to threading dies and more specifically to improvements in die heads for adjustably positioning the thread cutting chasers therein.

One of the objects of the present invention is to provide a die head having suitable mechanism associated therewith to facilitate the adjustment of the thread cutting chasers therein.

Another object of the invention resides in the provision of a die head having a rotatable cam plate configured for engagement with the thread cutting chasers to adjust the chasers radially of the die head.

Another object of the invention is to provide a face plate for the die head having a plurality of diametrically disposed grooves therein for the reception and retention of the thread cutting chasers.

Still another object of the invention comprehends a die head embodying a base plate, an apertured cam plate and a face plate with depending lugs, the office of the depending lugs being to extend through the cam plate and engage the base plate for limiting the movement of the cam plate.

Further objects of the invention are to provide a threading die that is simple and compact, economic of manufacture and which is efficient in operation.

Other objects and advantages more or less ancillary to the foregoing and the manner in which all the various objects are realized will appear in the following description, which considered in connection with the accompanying drawing, sets forth the preferred embodiment of the invention.

Referring to the drawing wherein the preferred embodiment of the invention is illustrated:

Fig. 1 is an end view of a die head showing a ratchet handle mounted thereon;

Fig. 2 is a side elevational view of the die head and ratchet handle with portions thereof shown in section in the interest of clarity;

Fig. 3 is a plan view of the die head;

Fig. 4 is a vertical sectional view of the die head, the section being taken on a plane indicated by line 4—4 of Fig. 3;

Fig. 5 is a transverse sectional view showing the locking members for the cam plate, the section being taken on a plane indicated by line 5—5 of Fig. 4; and Fig. 6 is a sectional view of a fragmentary portion of the die head, the section being taken on a plane indicated by line 6—6 of Fig. 3.

As shown in Figs. 2 and 3, the threading die head comprises a circular base or body portion 10 having a sleeve 11 formed integral and in coaxial alignment therewith. The base 10 and sleeve 11 are formed with a bore 12 which terminates at a reentrant wall 14 formed in the outer end of the sleeve. The wall 14 is provided with an opening 16 of reduced diameter which constitutes a guide for the reception of the stock that is to be threaded.

The peripheral surface of the sleeve 11 is configured for engagement with the socket 17 of a ratchet handle. The ratchet employed herein and its manner of connection with the sleeve 11 is of the form disclosed in Patent No. 2,255,009 to Carl H. Ingwer, dated September 2, 1941. A detailed description of the ratchet is, therefore, deemed unnecessary apart from such general reference to the parts thereof as may be necessary for a complete understanding of the invention.

A plate or disk 18 having a diameter slightly greater than that of the base portion 10 is seated thereon for rotative movement relative thereto. An opening is provided in the disk 18 coaxial of the bore 12 and being of a greater diameter than the bore 12. The portion of the disk 18 defining the opening therein is formed with a plurality of camming surfaces 19, as shown in Fig. 6. The disk 18 is formed with circumferentially spaced, arcuate shaped apertures 21.

A plurality of diametrically disposed thread cutting chasers 24 are positioned upon the disk 18 intermediate the apertures 21. The chasers 24 are formed with an enlarged end portion 25 defining a ledge or shoulder 26 configured for engagement with the camming surfaces 19. The shoulder 26 is provided with fillets 27 which engage a chamfered edge formed on the disk 18 to facilitate the rotative movement of the disk with respect to the chasers. The bottom wall or face of the enlarged end portion 25 of the chasers is adapted to engage the portion of the base 10 which projects inwardly beyond the disk 18 to provide a support for the chasers.

A face plate 29 having projections 30 thereon with radial grooves 31 formed therein is mounted on the chasers 24. The grooves 31 in the face plate 29 are machined to engage the parallel sides 33 and top wall 34 of the chasers. Depending lugs 36, Figs. 5 and 6, are formed on the face plate 29 intermediate the grooves 31. The lugs 36 project through the apertures 21 in the disk 18 and terminate in a groove 38 formed in the base 10 to retain the disk 18 upon the base. The lugs 36 are of a configuration complementary to the apertures 21 and have a sliding fit therein to facilitate the rotative movement of the disk 18 with respect to the base 10. The face plate 29 is secured to the base 10 by bolts 39 extending through the lugs 36 and threaded within the base 10. The bolts 39 are formed with enlarged heads which are embedded within recesses formed in the face plate 29.

The chasers 24 are configured to extend within the area of the bore 12 to define an opening therebetween commensurate with the opening 16 in the wall 14. The inner faces of the chasers are formed with teeth 40 of a conventional design.

In the operation of the improved die head the bar stock is normally fed through the opening 16 in the wall 14 for engagement with the chasers 24, although the design of the chasers is such as to enable the work to be fed through the die head from the opposite or face plate end. The depth of the thread formed on the bar stock is susceptible of slight variation through the adjustment of the chasers radially of the base 10. The disk 18 may be rotated, through a limited number of degrees, upon loosening of the bolts 39 in the face plate 29. A clockwise rotation of the disk 18 will then urge the camming surfaces 19 into engagement with the shoulders 26 of the chasers 24 to move the chasers inwardly of the base 10. The number of degrees of rotation of the disk 18 is limited by the lugs 36 within the apertures 21. Subsequent the advancement of the chasers the desired distance the bolts 39 are tightened within the base 10 to securely lock the face plate 29 and disk 18 thereto and at the same time secure the chasers 24 within the grooves 31 formed in the face plate 29. To move the chasers outwardly of the base 10 the disk 18 is rotated in a counterclockwise direction subsequent to which the chasers are manually adjusted in the grooves 31 to a predetermined position.

Although the foregoing description is necessarily of a detailed character, in order that the invention may be completely set forth, it is to be understood that the specific terminology is not intended to be restrictive or confining, and that various rearrangements of parts and modifications of detail may be resorted to without departing from the scope or spirit of the invention as herein claimed.

I claim:

1. A threading die comprising a body having a bore therethrough, a disk on said body having an opening therein of a diameter greater than the diameter of the bore, the portion of said disk defining the opening therein being configured to form a camming surface, a plurality of diametrically disposed thread cutting chasers supported on said disk, a face plate having grooves therein engageable with said chasers, said chasers having overhanging lips thereon engageable with the camming surface for adjusting the chasers radially of said body, said disk having circumferentially spaced apertures therein and locking means on said face plate extending through the apertures in said disk and engageable with said body to secure said chasers in a predetermined position.

2. A die head comprising a body having an annular recess in a face thereof, a cam plate supported on said body and having circumferentially spaced apertures therein registering with the recess in the body, a plurality of thread cutting chasers engageable with the cam plate and adjustable radially of the body upon the actuation of the cam plate, a face plate having grooves therein for the reception of said chasers, depending lugs on said face plate projecting through the apertures in said cam plate and terminating within the recess in said body, said lugs limiting the movement of the cam plate with respect to the body and face plate.

3. A threading die comprising a body having a bore therethrough, said body formed with an annular recess in a face thereof, a disk supported on said body for rotative movement with respect thereto, said disk having an opening therein of a greater diameter than the diameter of the bore, the portions of said disk defining the opening therein provided with camming surfaces, a plurality of diametrically disposed thread cutting chasers supported on said disk, a face plate having grooves therein for the reception of said chasers, said chasers having portions engageable with the camming surfaces for adjusting the chasers radially of the body upon the rotative movement of the disk, said disk having circumferentially spaced apertures therein, depending lugs on said face plate extending through the apertures in said disk and terminating within the recess in said body for limiting the movement of said disk with respect to said body and face plate, bolts in said face plate extending through said lugs and threaded within said body to securely lock the chasers in a predetermined position within the grooves in the face plate.

4. A die head comprising a body, an apertured disk supported on said body for rotative movement relative thereto, thread cutting chasers arranged on said disk, a face plate having radially extending grooves therein for the reception of said chasers, said disk having camming surfaces thereon engageable with said chasers for adjustably positioning the chasers within the grooves radially of the body, and means on said face plate extending through the apertures in the disk to delimit the movement of said disk and chasers.

CARL H. INGWER.
OSCAR E. SWANSON.